(No Model.)
A. B. LANDIS.
COMPENSATING JOURNAL BOX.
No. 501,726. Patented July 18, 1893.
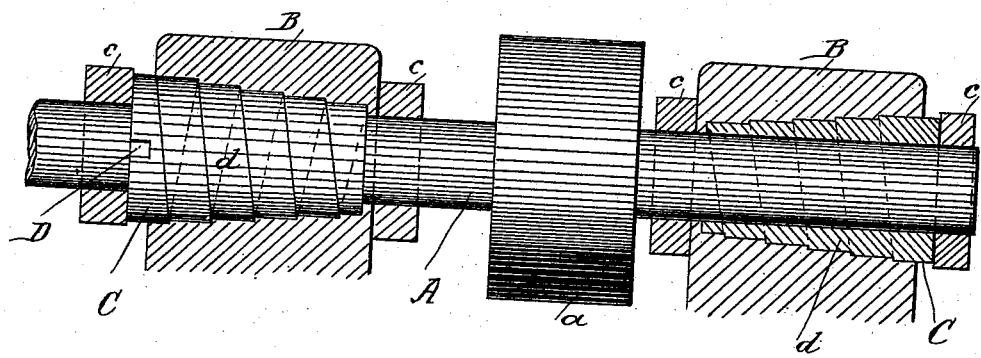
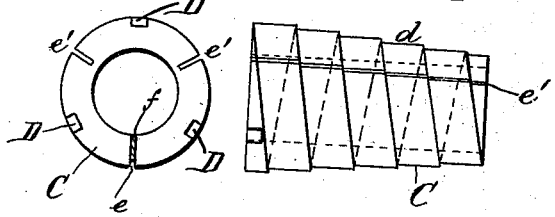
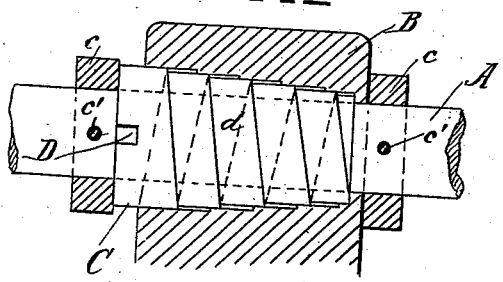
WITNESSES:
George H. Bliss.
Jno. F. Doran Jr
INVENTOR
Abraham B. Landis.
BY
Herbert W. T. Jenner.
ATTORNEY.

UNITED STATES PATENT OFFICE.

ABRAHAM B. LANDIS, OF WAYNESBOROUGH, PENNSYLVANIA.

COMPENSATING JOURNAL-BOX.

SPECIFICATION forming part of Letters Patent No. 501,726, dated July 18, 1893.

Application filed March 22, 1893. Serial No. 467,195. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Compensating Journal-Boxes; and I do hereby declare the following to be a full, clear, and exact description of the invention, such as will enable others skilled in the art to which it appertains to make and use the same.

This invention relates to boxes for journals; and it consists in the novel construction and combination of the parts hereinafter fully described and claimed, whereby the wear of the parts is compensated.

In the drawings: Figure 1 is a side view partly in section showing a shaft provided with boxes according to this invention. Fig. 2 is a detail side view of one of the boxes. Fig. 3 is an end view of the same. Fig. 4 is a side view partly in section showing the position of the box when the bearing is nearly worn out.

A is a shaft, and $a$ is a driving pulley secured on the shaft.

B are the supports for the shaft.

C are the compensating boxes in which the shaft revolves, and $c$ are collars secured on the shaft A by pins $c'$ and preventing it from moving endwise. Each box C has a flat-faced spiral step-cone $d$ formed on its exterior surface, and the supports have similar spiral bearings adapted to receive the said cones. Each box C has a slot $e$, formed or cut longitudinally clear through the solid metal of its side from one end to the other, which permits it to be contracted upon the shaft. The box also has slots $e'$ cut partly through it from the outside to make it more elastic.

D are notches in the larger end of the box so that it may be engaged by a wrench of approved construction.

The slot $e$ is preferably filled with soft material $f$, such as wood, which will yield when the box is contracted about the shaft.

In ordinary working the box rests in its bearing in the position shown in Fig. 1. As the shaft and its bearing become worn, the box is turned in its bearing in the support from time to time to compensate for the wear, until the box takes the position shown in Fig. 4, when the box is nearly worn out. The soft wood packing is taken out and reduced in thickness as often as is necessary in adjusting the box after it has been compressed as much as possible. When the box is turned in its bearing it contracts upon the shaft but it does not move endwise, so that the position of the shaft and its collars remains unaltered.

What I claim is—

The combination, with a shaft, of a revoluble shaft bearing provided with a longitudinal slot in its side and a flat-faced spiral step-cone on its periphery, a support provided with a spiral bearing for the said step-cone to rest in, and collars secured on the said shaft and bearing respectively against the larger end of the said step-cone and against the end of the said support beyond the smaller end of the step-cone, substantially as and for the purpose set forth.

In testimony whereof I affix my signature in presence of two witnesses.

ABRAHAM B. LANDIS.

Witnesses:
   D. M. GOOD, Jr.,
   V. B. GOOD.